(12) United States Patent
Haltiner, Jr. et al.

(10) Patent No.: US 6,984,466 B2
(45) Date of Patent: Jan. 10, 2006

(54) MANIFOLD SIZING AND CONFIGURATION FOR A FUEL CELL STACK

(75) Inventors: Karl J. Haltiner, Jr., Fairport, NY (US); Haskell Simpkins, Grand Blane, MI (US); Sean M. Kelly, Churchville, NY (US); Bernhard A. Fischer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 385 days.

(21) Appl. No.: 10/178,829

(22) Filed: Jun. 24, 2002

(65) Prior Publication Data

US 2003/0235749 A1    Dec. 25, 2003

(51) Int. Cl.
H01M 8/02    (2006.01)
H01M 8/24    (2006.01)

(52) U.S. Cl. .................... 429/39; 429/34; 180/65.3
(58) Field of Classification Search .............. 429/26, 429/34, 39, 13; 180/65.3
See application file for complete search history.

(56) References Cited

U.S. PATENT DOCUMENTS

| | | | |
|---|---|---|---|
| 6,321,145 B1 | 11/2001 | Rajashekara | |
| 6,416,899 B1 * | 7/2002 | Wariishi et al. | 429/38 |
| 6,423,896 B1 | 7/2002 | Keegan | |
| 6,455,185 B2 | 9/2002 | Bircann et al. | |
| 6,485,852 B1 | 11/2002 | Miller et al. | |
| 6,509,113 B2 | 1/2003 | Keegan | |
| 6,551,734 B1 | 4/2003 | Simpkins et al. | |
| 6,562,496 B2 | 5/2003 | Faville et al. | |
| 6,586,128 B1 * | 7/2003 | Johnson et al. | 429/34 |
| 6,608,463 B1 | 8/2003 | Kelly et al. | |
| 6,613,468 B2 | 9/2003 | Simpkins et al. | |
| 6,613,469 B2 | 9/2003 | Keegan | |
| 6,627,339 B2 | 9/2003 | Haltiner, Jr. | |
| 6,630,264 B2 | 10/2003 | Haltiner, Jr. et al. | |
| 6,756,149 B2 * | 6/2004 | Knights et al. | 429/38 |
| 6,808,839 B2 * | 10/2004 | Tsuyoshi | 429/38 |

OTHER PUBLICATIONS

Fuel Cell Fact Sheet, Environmental and Energy Study Institute, Feb. 2000, http://www.eesi.org/publications/02.00fuelcell.pdf.*

* cited by examiner

Primary Examiner—Stephen J. Kalafut
(74) Attorney, Agent, or Firm—Paul L. Marshall

(57) ABSTRACT

A fuel cell assembly having manifold means for providing fuel and air to, and removing spent fuel and air from, flow passageways across the anodes and cathodes in a fuel cell stack. The sizes and proportions of the supply and return manifolds are optimized, and the total cross-sectional area of the return manifold is about twice the cross-sectional area of the supply manifold. The pressure drop in the manifolds is less than about one-quarter of the total pressure drop across the anode and cathode passageways in the stack, which ratio may be attained by adjusting the thickness of the anode and cathode spacers and/or the size of the chimneys. Widthwise uniformity of flow across the anodes and cathodes is improved by forming each of the manifolds as a plurality of smaller, parallel flow conduits.

10 Claims, 6 Drawing Sheets

MANIFOLD SIZING AND CONFIGURATION FOR A FUEL CELL STACK

TECHNICAL FIELD

The present invention relates to hydrogen/oxygen fuel cells; more particularly, to fuel cell stacks comprising a plurality of individual cells connected by interconnect elements; and most particularly, to a fuel cell assembly or system wherein manifolds for supplying fuel and air to and from fuel cells are sized and configured for optimal flow through the cells and stacks.

BACKGROUND OF THE INVENTION

Fuel cells which generate electric current by the electrochemical combination of hydrogen and oxygen are well known. In one form of such a fuel cell, an anodic layer and a cathodic layer are deposited on opposite surfaces of an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode where it is ionized. The oxygen anions transport through the electrolyte and combine with hydrogen ions to form water. The cathode and the anode are connected externally through a load to complete the circuit whereby electrons are transferred from the anode to the cathode. When hydrogen is derived from "reformed" hydrocarbons, the reformate gas includes CO which is converted to $CO_2$ at the anode via an oxidation process similar to that performed on the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is usual to stack together, in electrical series, a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. The perimeter spacers include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack. A complete SOFC assembly also includes appropriate piping and valving, as well as a programmable electronic control unit (ECU) for managing the activities of the subsystems simultaneously.

The various components of a fuel cell stack, including the fuel cells themselves, the anode and cathode spacers which create the flow passageways across the anodes and cathodes, the perimeter seals, and the electrical interconnects, are rectangular and are perforated along all four edges. When the components are stacked up, the perforations define fuel and air distribution manifolds, known as "chimneys," within the fuel cell stack perpendicular to the planes of the stacked fuel cells, through which fuel and air may be supplied to and removed from the individual fuel cells. The heights of the air and fuel passageways across the fuel cells and the size and shape of the chimneys are not optimized in prior art assemblies for the most nearly uniform flow of fuel and air through the stack at the optimal pressure drop.

It is a principal object of the present invention to provide an improved fuel cell assembly wherein fuel cell output is increased through more uniform flow of fuel and air through the stack.

It is a further object of the invention to provide such a fuel cell stack wherein flow restriction through the stack is minimized.

SUMMARY OF THE INVENTION

Briefly described, a fuel cell assembly in accordance with the invention has manifold means for providing fuel and air to, and removing spent fuel and air from, flow passageways across the anodes and cathodes in a fuel cell stack. The sizes and proportions of the supply and return manifolds ("chimneys") are optimized by Computational Fluid Dynamics analysis. The total cross-sectional area of the return chimney is preferably about twice the cross-sectional area of the supply chimney. The pressure drop in the chimneys is preferably less than about one-quarter of the total pressure drop across the anode and cathode passageways in the stack, which ratio may be attained by adjusting the thickness of the anode and cathode spacers and/or the size of the chimneys. Widthwise uniformity of flow across the anodes and cathodes is improved by forming each of the chimneys as a plurality of smaller, parallel flow passages.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
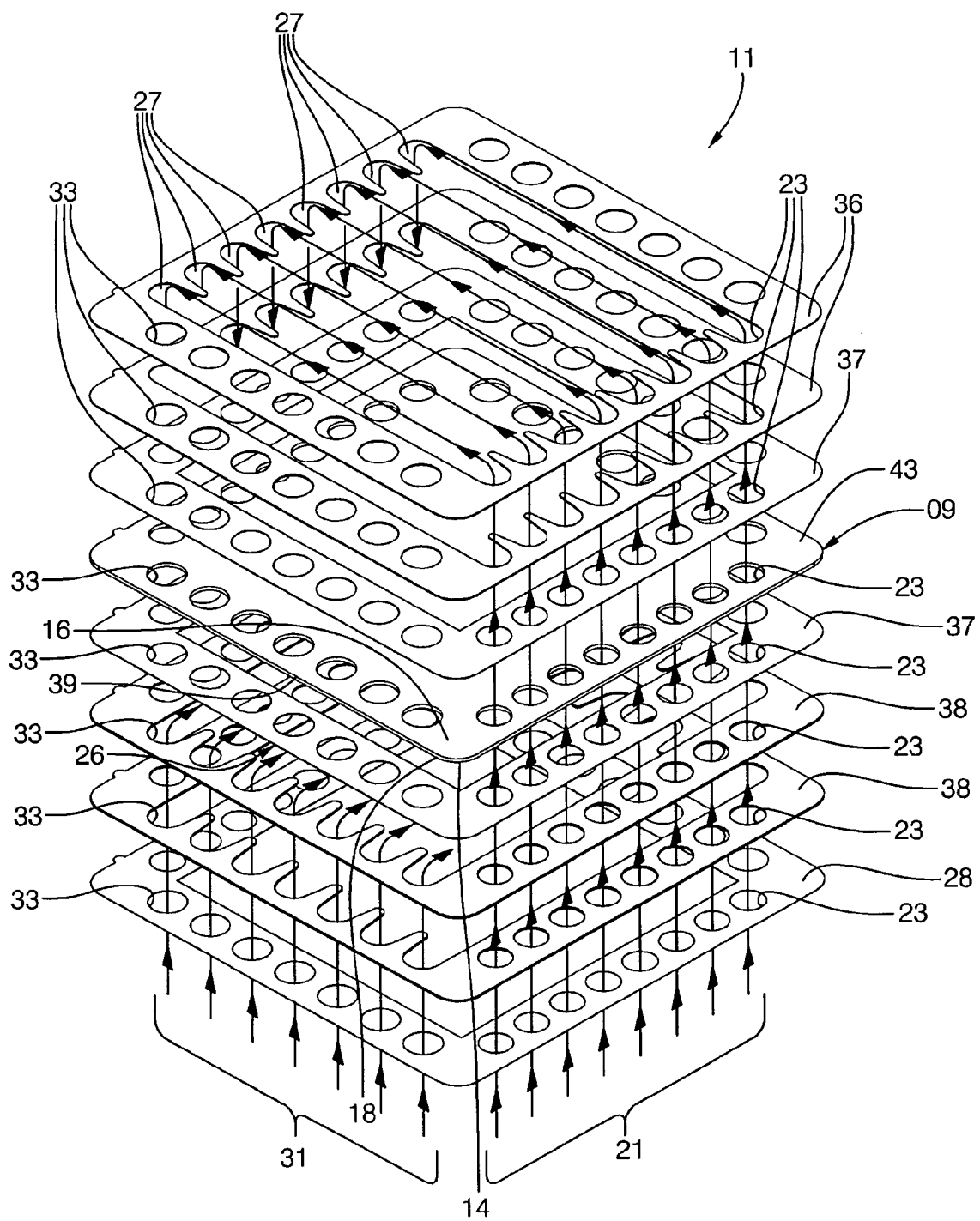
FIG. 1 is an exploded isometric view of a single solid oxide fuel cell, showing the various elements and the flow paths of fuel and oxygen through the cell.
Figure 2:
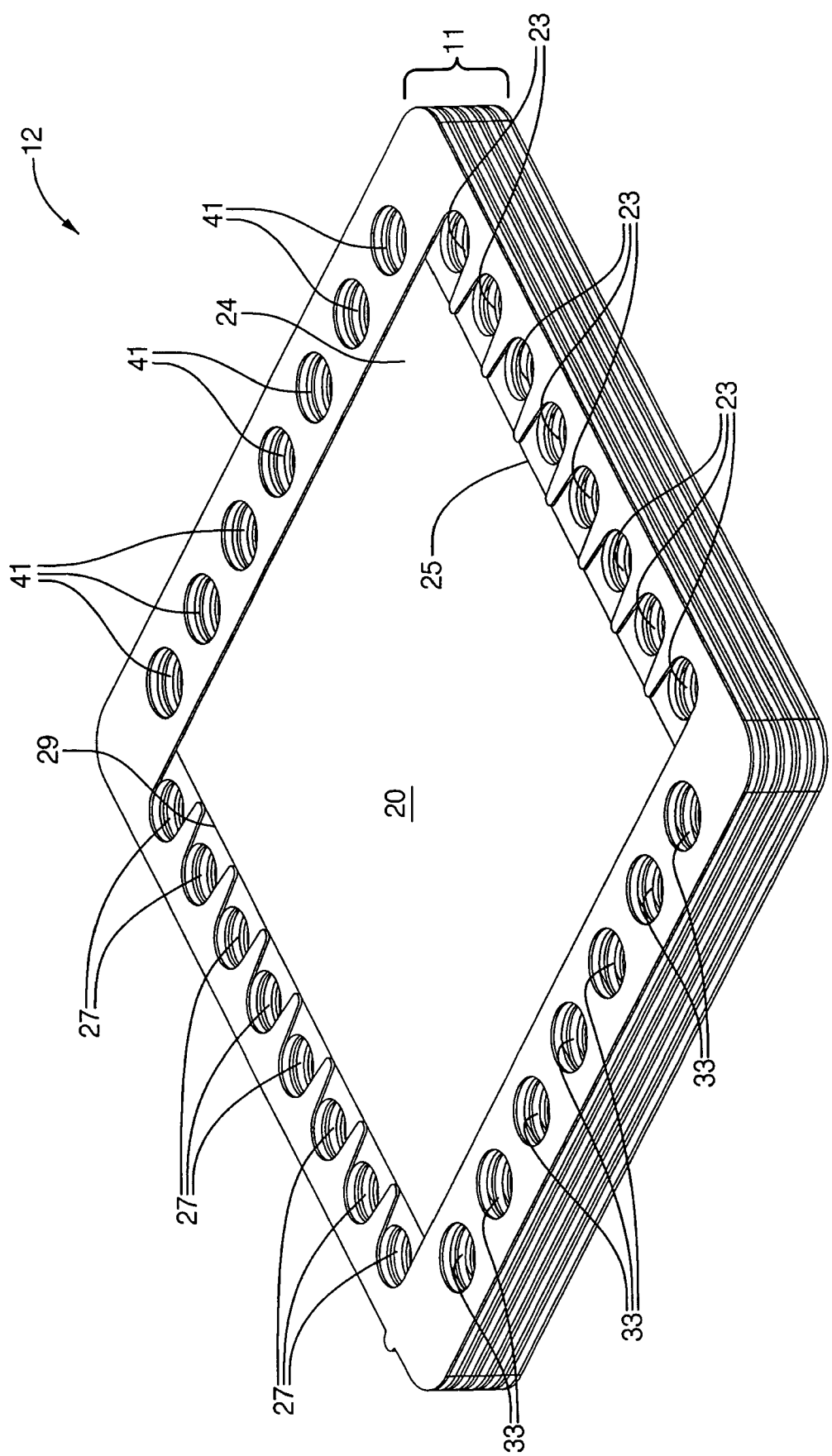
FIG. 2 is an isometric view of a fuel-cell stack comprising five cells like the cell shown in FIG. 1.
Figure 3:
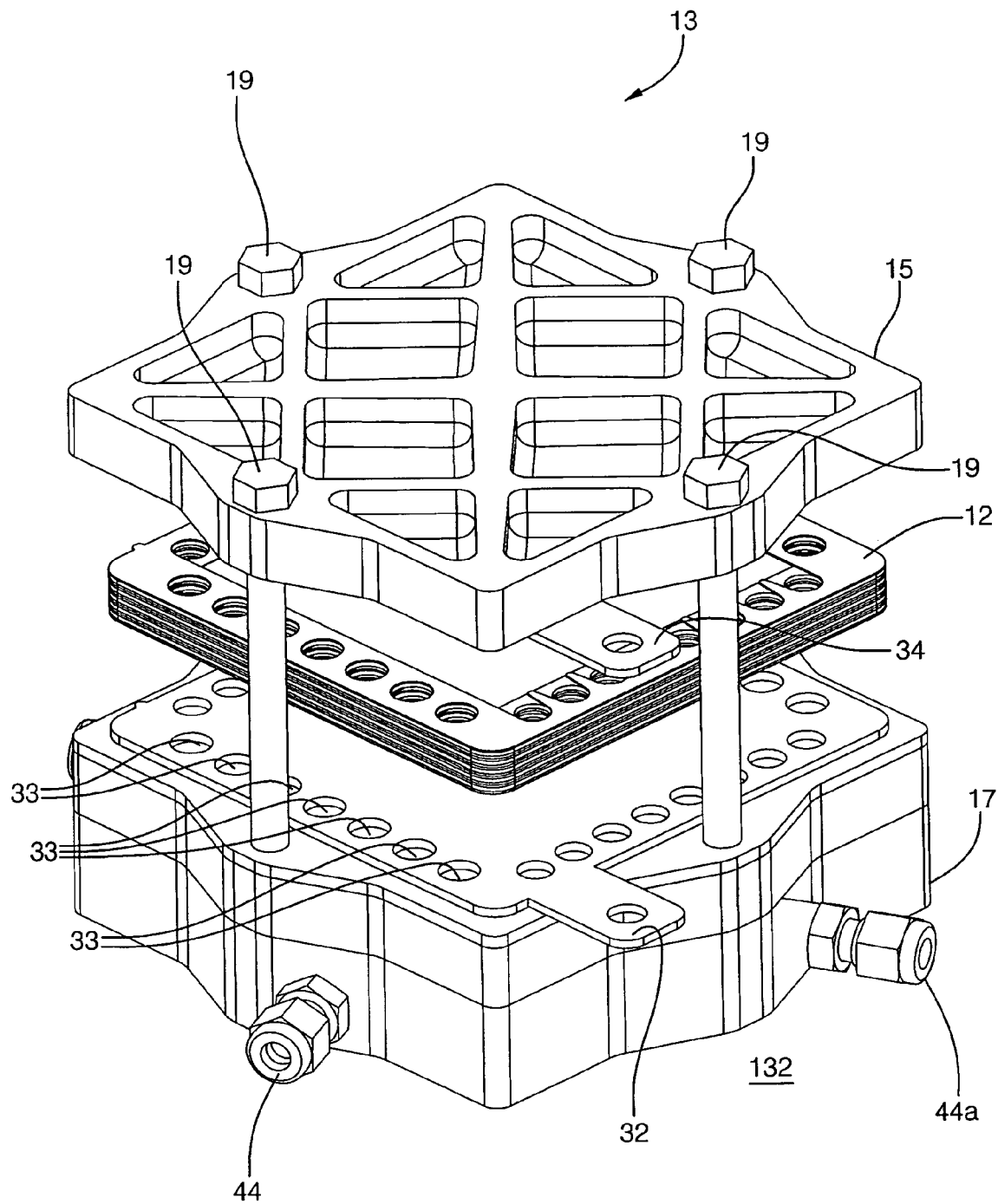
FIG. 3 is an isometric view like that shown in FIG. 2, partially exploded, showing the addition of current collectors, end plates, and bolts to form a complete fuel cell stack ready for use.

FIGS. 1 through 3 are useful in describing generally the structure of a multiple fuel cell stack assembly. FIGS. 4 through 8 are illustrative of improved fuel cell assemblies in accordance with the invention.

Referring to FIGS. 1 and 2, an individual fuel cell 11 includes a multilayer fuel cell element 09 comprising an electrolyte 14 (E) having an anode 16 or positive element (P) deposited on a first surface thereof and a cathode 18 or negative element (N) deposited on a second surface thereof. Thus, element 09, which is the actual "fuel cell," is known in the art by the acronym PEN. Passage 24 for flow of fuel 21 across the free surface 20 of anode 16 is provided by first cut-out spacers 36 sealed to anode 16 by peripheral seal 37, and passage 26 for flow of air 31 across the free surface of cathode 18 is provided by second cut-out spacers 38 sealed to cathode 18 by another peripheral seal 37. Fuel 21, typically in the form of hydrogen or reformate gas, is provided at a first edge 25 of anode surface 20 via supply conduits 23 formed in each element and is removed via exhaust conduits 27 provided at a second and opposite edge 29 of anode surface 20. Oxygen, typically in the form of air, is provided via supply conduits 33 to passages 26 at a first edge 39 of cathode 18 and is removed via exhaust conduits 41 at a second and opposite edge 43 of cathode 18.

Referring to FIG. 3, a plurality of fuel cells 11 may be stacked together to form a stack 12, five such cells being shown in FIG. 2. In a complete working fuel cell 13, stack 12 is sandwiched between an anodic current collector 34 and a cathodic current collector 32 which in turn are sandwiched between a top plate 15 and a gas-manifold base 17, the entire assembly being bound together by bolts 19 extending through bores in top plate 15 and threadedly received in bores in base 17. Air is provided to base 17 for supply to conduits 33 via a first connector 44. In the stack, the cathode air and anode fuel conduits define distribution manifolds, or "chimneys", as described above.

Figure 4:
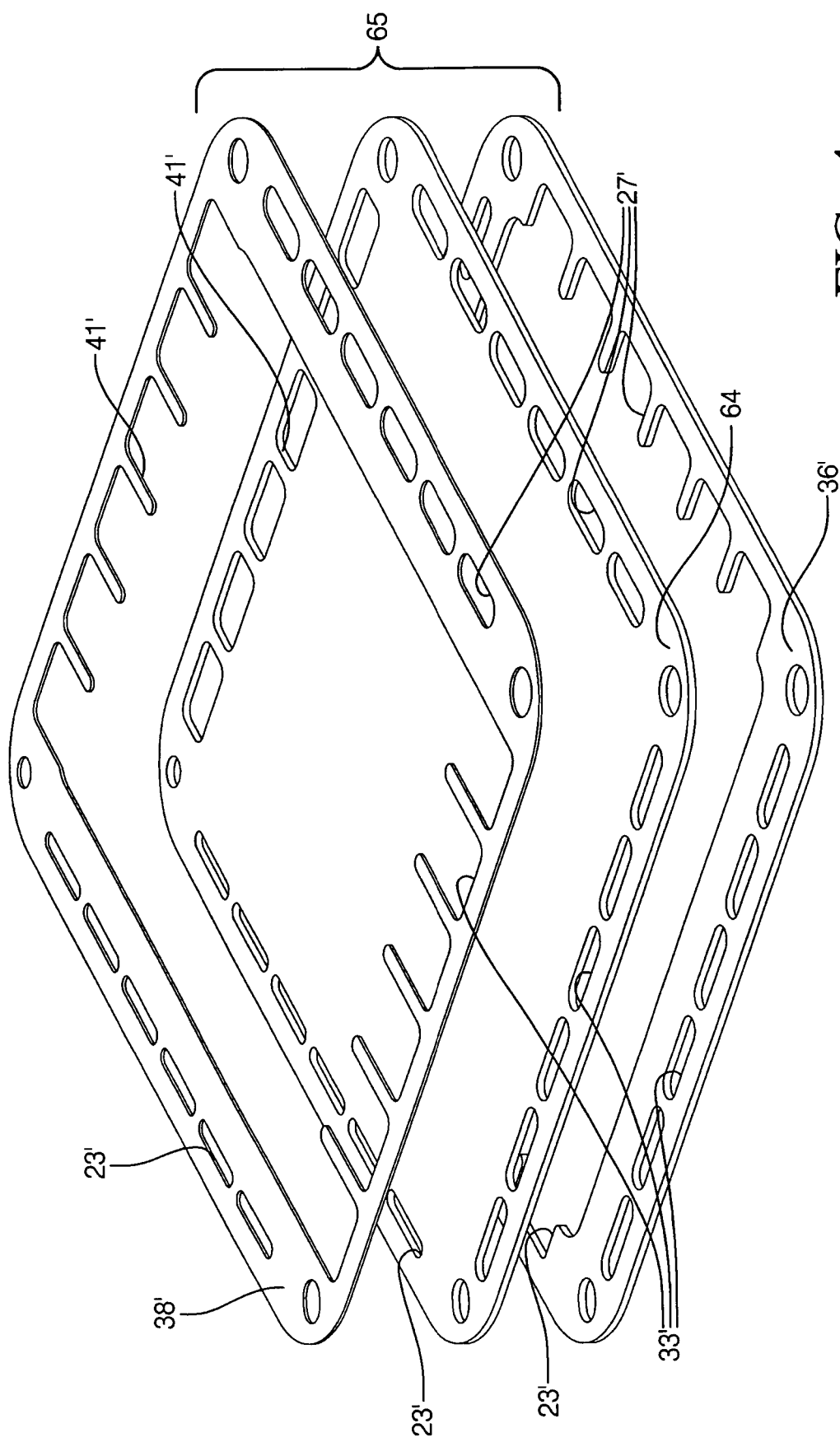
FIG. 4 is an exploded isometric view of a separator subassembly in accordance with the invention.
Figure 5:
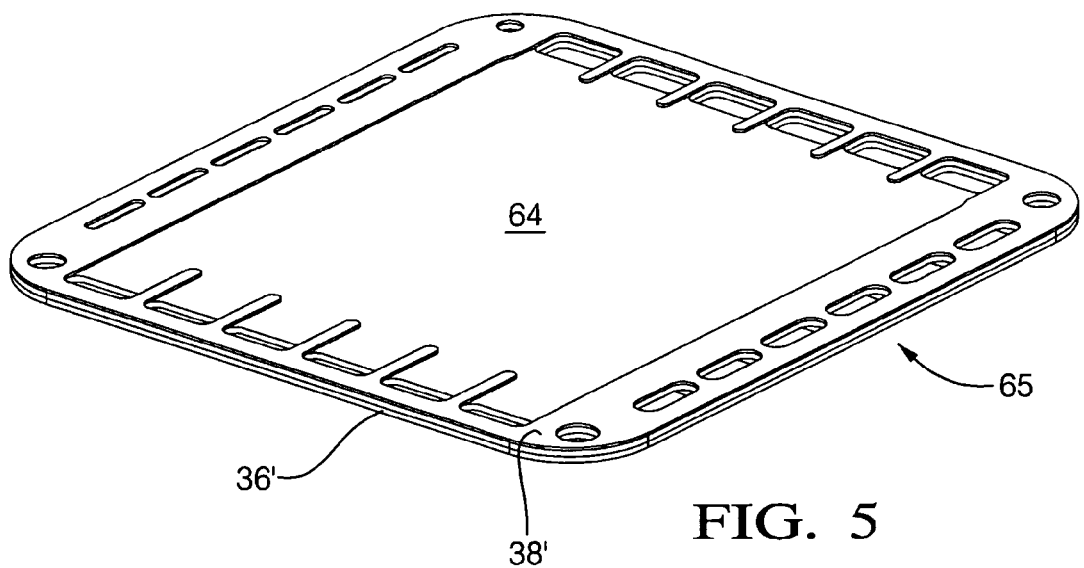
FIG. 5 is an isometric view of the subassembly shown in FIG. 4.
Figure 6:
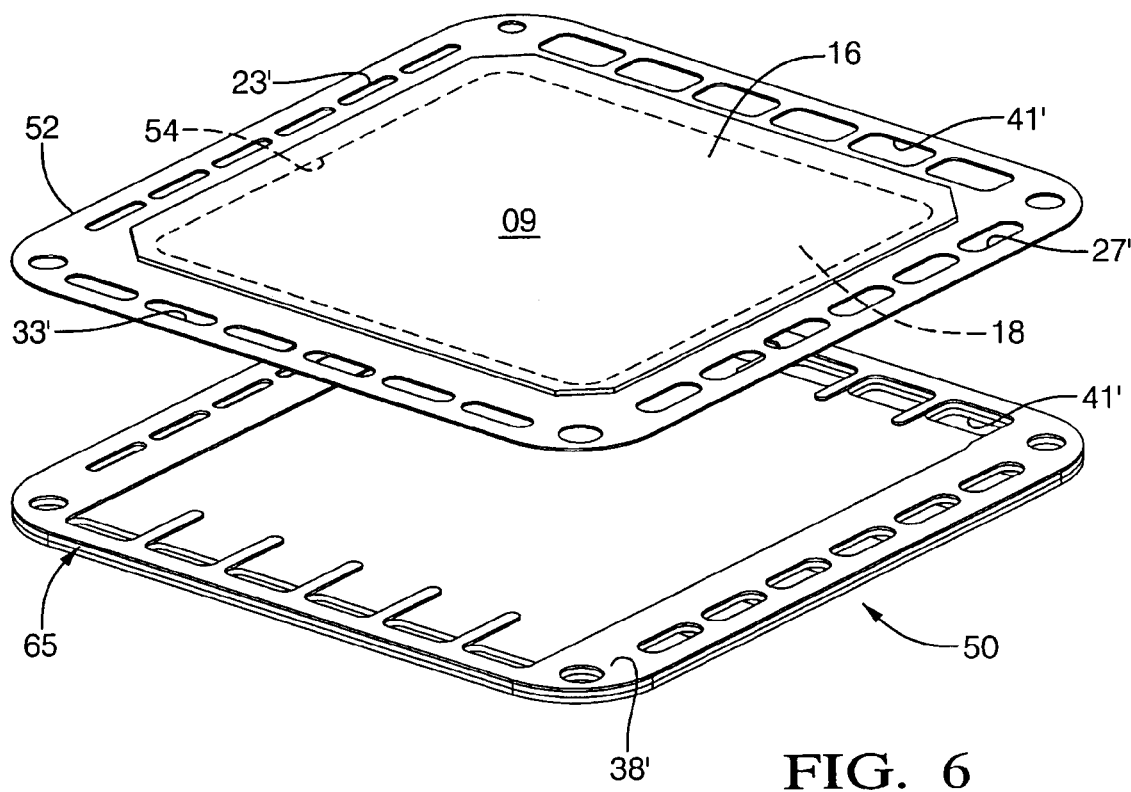
FIG. 6 is an exploded isometric view, showing the separator subassembly ready for joining to a framed PEN for forming a modular fuel cell unit.

Referring to FIGS. 4 through 6, an improved structure for a modular fuel cell 50 (FIG. 6) includes four sheet metal parts stamped from flat stock which do not require any forming operations such as folding or dishing. Each part has a different thickness to suit its function. Because the parts are flat, stacked on top of one another, and metallurgically joinable, the cell active area is maximized because there is no wasted space in radial corners.

The first sheet is the cell mounting frame 52. It needs to be thick enough only to provide sufficient structure to allow the fuel cell element (PEN) 09 (FIG. 6) to be mounted to it. Frame 52 has a central opening 54 smaller than the external dimensions of the PEN such that the surface of electrolyte 14 outboard of cathode layer 18 can be bonded and sealed to mounting frame 52. Opening 54 in frame 52 allows the surface of cathode 18 to be exposed to cathode air flow in the fuel cell assembly. The anode side of the PEN could be mounted to the PEN frame 52 as an alternate configuration, if desired. Frame 52 also has openings 33',41' for passage of cathode air and openings 23',27' for passage of fuel to supply all the cells in a stack. None of these openings is open in the plane of frame 52 and therefore gas cannot flow out of the manifold chimneys in this part. The PEN does not extend to the outer edges of frame 52 nor to the air or fuel openings. Thus, the PEN does not require openings formed in it which are difficult to fabricate and which increase the chance of PEN cracking. Moreover, the edges of the PEN do not require sealing as they otherwise would because of the porous anode material.

Figure 7:
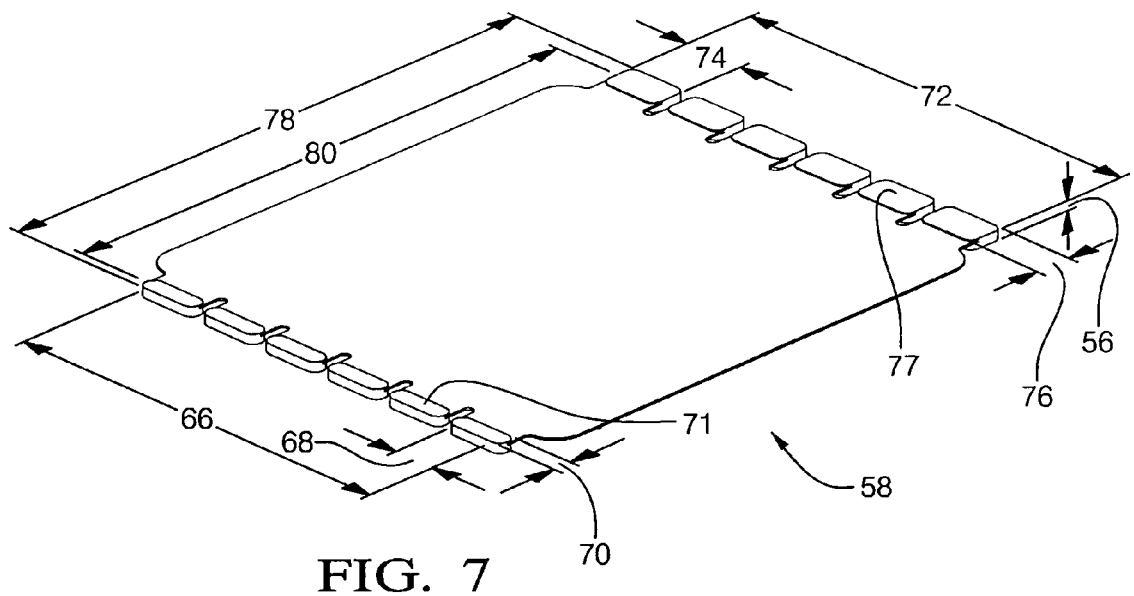
FIG. 7 is an isometric view of the cathode air flow field.

The second sheet is a cathode spacer 38', analogous to spacer 38 in FIG. 1. The thickness of spacer 38' determines the height 56 of the cathode air flow field 58 (FIG. 7). Anode gas openings 23',27' are not open in the plane of spacer 38' so that anode gas is contained in the manifold chimneys. Cathode openings 33',41', however, are open in the plane of the spacer to allow cathode air to flow across the surface of the cathode from supply opening 33' to return opening 41'. Spacer 38' is positioned on the cathode side of cell mounting frame 52.

Figure 8:
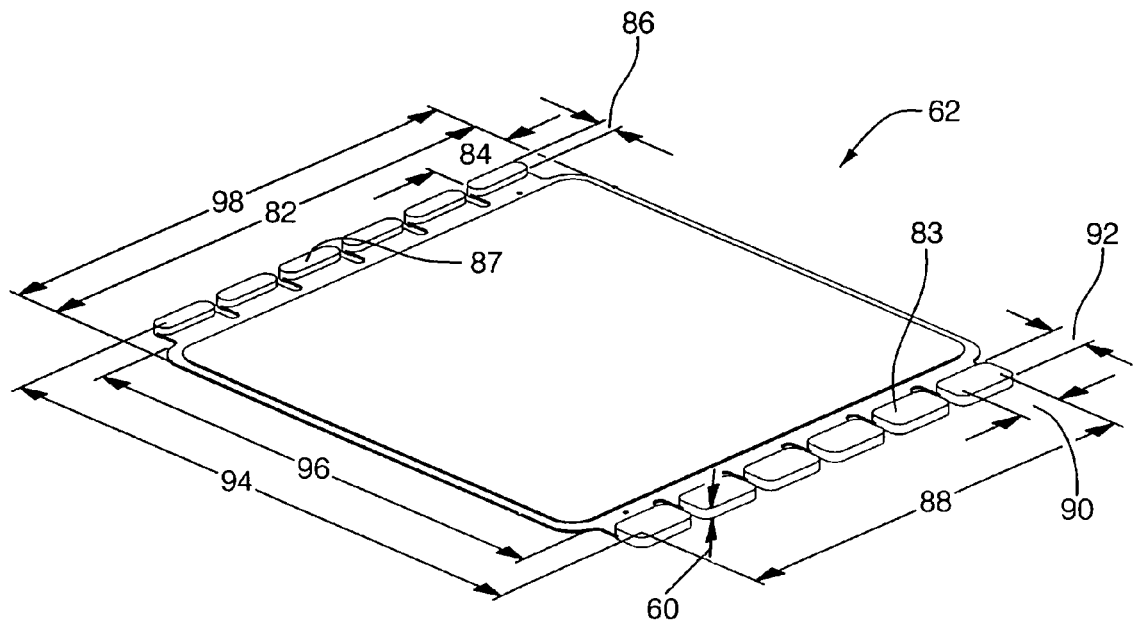
FIG. 8 is an isometric view of the anode gas flow field.

The third sheet is an anode spacer 36', analogous to spacer 36 in FIG. 1. The thickness of spacer 36' determines the height 60 of the anode flow field 62 (FIG. 8). Cathode gas openings 33',41' are not open in the plane of spacer 36' so that cathode gas is contained in the manifold chimneys. Anode openings 23',27', however, are open in the plane of the spacer to allow anode gas to flow across the surface of the anode from supply opening 23' to return opening 27'. Spacer 36' is positioned on the anode side of cell mounting frame 52.

The fourth sheet is a separator plate 64, which needs to be thick enough only to provide sufficient structure for separating the anode gas flow in one cell from the cathode air flow in an adjacent cell in a fuel cell stack. The only openings in separator plate 64 are anode manifold openings 23',27' and cathode manifold openings 33', 41' which form part of the supply and return chimneys. None of these openings is open in the plane of the plate and therefore no gas is allowed to flow out of separator plate 64.

The four plates 36',38',52,64 may be joined by any combination of welding or brazing which suits the stack assembly. Also, they may be assembled (joined) in any order or combination which suits the assembly process. In a preferred assembly sequence, cathode spacer 38' and anode spacer 36' are attached to opposite sides of separator plate 64, as shown in FIG. 4, to provide a separator subassembly 65, shown in FIG. 5. Subassembly 65 is then attached to cell mounting frame 52 carrying PEN 09, as shown in FIG. 6, to form fuel cell module 50. Any desired number of modules 50 may be stacked together to form a fuel cell stack 12 (FIG. 3).

The sheet thicknesses of the four plates may be readily changed as required to adjust the structural properties or field flow heights. Since these parts may be formed by a blanking process, the tooling can be simple and inexpensive. Alternatively, the plates may be formed by other processes, for example, water-jet cutting. All of these factors make fuel cells in accordance with the invention well-suited to high-volume manufacturing as well as low volume or prototype manufacturing.

Referring to FIGS. 4–8, for a fuel cell assembly having a plurality of cells, for example, 60 cells divided into two stacks of 30 cells each, the optimal sizes for the fuel conduits 23',27' and air conduits 33',41', as well as the heights 56, 60 of the cathode and anode flow fields 58, 62 have been determined by computer analysis using Computational Fluid Dynamics. "Optimal" means providing non-stagnating, essentially uniform flow across the surface of the anodes and the cathode and minimal back pressure in the anode and cathode exhaust chimneys.

The cathode air flow field 58 is shown in FIG. 7, having an entry width 66 divided among six supply conduits 33' of equal width 68 and length 70, each having a cross-sectional flow area 71, an exit width 72 divided among six return conduits 41' of equal width 74 and length 76, each having a cross-sectional flow area 77, an overall flow field length extent 78, and an average flow field length extent 80 between the centerlines of the supply and return conduits.

The anode fuel flow field 62 is shown in FIG. 8, having an entry width 82 divided among six supply conduits 23' of equal width 84 and length 86, each having a cross-sectional flow area 87, an exit width 88 divided among six return conduits 27' of equal width 90 and length 92, each having a cross-sectional flow area 93, an overall flow field length extent 94, an average flow field length extent 96, and an overall flow field width 98 across the anode.

Pressure losses along the manifold chimneys were also considered as a function of the conduit cross-sectional dimensions, conduit length, and gas flow rate.

It was found that counterflow between the supply chimneys and the return chimneys, wherein gas is returned in the reverse direction from its supply, is superior to co-flow. It was also found that the return chimneys should have a cross-sectional area at least 1.5 times, and preferably about 2 times, that of the supply chimneys, and that the pressure drop across the cells, between the supply and return chimneys, should be more than about 4 times the total pressure drop in the chimneys. The pressure drop across the cells can be changed by changing the thickness of the anode spacer 36' or the cathode spacer 38', as required to change the flow field height 62,58, respectively. Alternatively, the chimneys can be re-sized to adjust the chimney pressure drops.

It is known that flow distribution across the width 72,98 of the flow field is highly important to the efficiency and lifetime of a fuel cell, and it was found that breaking the chimneys into a series of shorter, parallel mini-chimneys having optimized lengths and widths, as shown in FIGS. 4–8, substantially improved side-to-side gas distribution.

In addition, the material left between the chimneys improves the structural integrity of the stack and increases the transfer of waste heat from the interior of the stack to the exterior of the stack.

A fuel cell assembly in accordance with the invention is especially useful as an auxiliary power unit (APU) for vehicles 132 on which the APU may be mounted as shown in FIG. 3, such as cars and trucks, boats and ships, and airplanes, wherein motive power is supplied by a conventional engine and the auxiliary electrical power needs are met by the SOFC assembly.

A fuel cell assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly including a plurality of individual fuel cells defining a fuel cell stack, comprising:
   a) a plurality of anodes defining a plurality of anode fuel passageways;
   b) a plurality of cathodes defining a plurality of cathode air passageways;
   c) an anode gas supply manifold having a first cross-sectional area providing a first pressure drop in said supplied anode gas along said manifold;
   d) an anode gas return manifold having a second cross-sectional area providing a second pressure drop in said returned anode gas along said manifold;
   e) a cathode air supply manifold having a third cross-sectional area providing a third pressure drop in said supplied cathode air along said manifold; and
   f) a cathode air return manifold having a fourth cross-sectional area providing a fourth pressure drop in said supplied cathode air along said manifold,
   wherein said second cross-sectional area is at least about 1.5 times said first cross-sectional area,
   wherein an anode fuel pressure drop exists between each of the entrances and exits to the plurality of said anode passageways, and wherein said anode fuel pressure drop is at least twice the sum of said first and second pressure drops.

2. A fuel cell assembly in accordance with claim 1 wherein said second cross-sectional area is about 2 times said first cross-sectional area.

3. A fuel cell assembly in accordance with claim 1 wherein said fourth cross-sectional area is at least about 1.5 times said third cross-sectional area.

4. A fuel cell assembly in accordance with claim 1 wherein said fourth cross-sectional area is about 2 times said third cross-sectional area.

5. A fuel cell assembly including a plurality of individual fuel cells defining a fuel cell stack, comprising:
   a) a plurality of anodes defining a plurality of anode fuel passageways;
   b) a plurality of cathodes defining a plurality of cathode air passageways;
   c) an anode gas supply manifold having a first cross-sectional area providing a first pressure drop in said supplied anode gas along said manifold;
   d) an anode gas return manifold having a second cross-sectional area providing a second pressure drop in said returned anode gas along said manifold;
   e) a cathode air supply manifold having a third cross-sectional area providing a third pressure drop in said supplied cathode air along said manifold; and
   f) a cathode air return manifold having a fourth cross-sectional area providing a fourth pressure drop in said supplied cathode air alone said manifold,
   wherein said second cross-sectional area is at least about 1.5 times said first cross-sectional area,
   wherein a cathode air pressure drop exists between each of the entrances and exits to the plurality of said cathode air passageways, and wherein said cathode air pressure drop is at least twice the sum of said third and fourth pressure drops.

6. A fuel cell assembly including a plurality of individual fuel cells defining a fuel cell stack, comprising:
   a) a plurality of anodes defining a plurality of anode fuel passageways;
   b) a plurality of cathodes defining a plurality of cathode air passageways;
   c) an anode gas supply manifold having a first cross-sectional area providing a first pressure drop in said supplied anode gas alone said manifold;
   d) an anode gas return manifold having a second cross-sectional area providing a second pressure drop in said returned anode gas along said manifold;
   e) a cathode air supply manifold having a third cross-sectional area providing a third pressure drop in said supplied cathode air along said manifold; and f) a cathode air return manifold having a fourth cross-sectional area providing a fourth pressure drop in said supplied cathode air along said manifold, wherein said second cross-sectional area is at least about 1.5 times said first cross-sectional area, wherein said anode gas supply manifold comprises a plurality of anode gas supply conduits disposed in parallel flow.

7. A fuel cell assembly including a plurality of individual fuel cells defining a fuel cell stack, comprising:
   a) a plurality of anodes defining a plurality of anode fuel passageways;
   b) a plurality of cathodes defining a plurality of cathode air passageways;
   c) an anode gas supply manifold having a first cross-sectional area providing a first pressure drop in said supplied anode gas along said manifold;
   d) an anode gas return manifold having a second cross-sectional area providing a second pressure drop in said returned anode gas along said manifold;
   e) a cathode air supply manifold having a third cross-sectional area providing a third pressure drop in said supplied cathode air along said manifold; and
   f) a cathode air return manifold having a fourth cross-sectional area providing a fourth pressure drop in said supplied cathode air along said manifold,
   wherein said second cross-sectional area is at least about 1.5 times said first cross-sectional area,
   wherein said anode gas return manifold comprises a plurality of anode gas return conduits disposed in parallel flow.

8. A fuel cell assembly including a plurality of individual fuel cells defining a fuel cell stack, comprising:
   a) a plurality of anodes defining a plurality of anode fuel passageways;
   b) a plurality of cathodes defining a plurality of cathode air passageways;
   c) an anode gas supply manifold having a first cross-sectional area providing a first pressure drop in said supplied anode gas along said manifold;
   d) an anode gas return manifold having a second cross-sectional area providing a second pressure drop in said returned anode gas along said manifold;
   e) a cathode air supply manifold having a third cross-sectional area providing a third pressure drop in said supplied cathode air along said manifold; and
   f) a cathode air return manifold having a fourth cross-sectional area providing a fourth pressure drop in said supplied cathode air along said manifold,
   wherein said second cross-sectional area is at least about 1.5 times said first cross-sectional area,
   wherein said cathode air supply manifold comprises a plurality of cathode air supply conduits disposed in parallel flow.

9. A fuel cell assembly including a plurality of individual fuel cells defining a fuel cell stack, comprising:
   a) a plurality of anodes defining a plurality of anode fuel passageways;
   b) a plurality of cathodes defining a plurality of cathode air passageways;
   c) an anode gas supply manifold having a first cross-sectional area providing a first pressure drop in said supplied anode gas along said manifold;
   d) an anode gas return manifold having a second cross-sectional area providing a second pressure drop in said returned anode gas along said manifold;
   e) a cathode air supply manifold having a third cross-sectional area providing a third pressure drop in said supplied cathode air along said manifold; and
   f) a cathode air return manifold having a fourth cross-sectional area providing a fourth pressure drop in said supplied cathode air along said manifold,
   wherein said second cross-sectional area is at least about 1.5 times said first cross-sectional area,
   wherein said cathode air return manifold comprises a plurality of cathode air return conduits disposed in parallel flow.

10. A motorized vehicle comprising, a fuel cell assembly including a fuel cell having
   a plurality of anodes defining a plurality of anode fuel passageways,
   a plurality of cathodes defining a plurality of cathode air passageways,
   an anode gas supply manifold having a first cross-sectional area providing a first pressure drop in said supplied anode gas along said manifold,
   an anode gas return manifold having a second cross-sectional area providing a second pressure drop in said returned anode gas along said manifold,
   a cathode air supply manifold having a third cross-sectional area providing a third pressure drop in said supplied cathode air along said manifold, and
   a cathode air return manifold having a fourth cross-sectional area providing a fourth pressure drop in said supplied cathode air along said manifold,
   wherein said second cross-sectional area is at least about 1.5 times said first cross-sectional area,
   wherein said fourth cross-sectional area is at least about 1.5 times said third cross-sectional area, and
   wherein an anode fuel pressure drop exists between each of the entrances and exits to the plurality of said anode passageways, and wherein said anode fuel pressure drop is at least twice the sum of said first and second pressure drops.

* * * * *

UNITED STATES PATENT AND TRADEMARK OFFICE
CERTIFICATE OF CORRECTION

| | | |
|---|---|---|
| PATENT NO. | : 6,984,466 B2 | Page 1 of 1 |
| APPLICATION NO. | : 10/178829 | |
| DATED | : January 10, 2006 | |
| INVENTOR(S) | : Haltiner, Jr. et al. | |

It is certified that error appears in the above-identified patent and that said Letters Patent is hereby corrected as shown below:

Col. 1, line 3, insert:

This invention was made with Government support under
    DE-FC26-02NT41246 awarded by DOE.
    The Government has certain rights in this invention.

Signed and Sealed this

Twenty-ninth Day of July, 2008

JON W. DUDAS
*Director of the United States Patent and Trademark Office*